United States Patent [19]

Li et al.

[11] Patent Number: 5,733,681
[45] Date of Patent: Mar. 31, 1998

[54] NON-AQUEOUS BATTERY WITH NOVEL LITHIUM MANGANESE OXIDE CATHODE

[75] Inventors: Wu Li, Burnaby; Jeffrey Raymond Dahn, Surrey, both of Canada

[73] Assignee: Moli Energy (1990) Limited, Canada

[21] Appl. No.: 769,668

[22] Filed: Dec. 19, 1996

Related U.S. Application Data

[62] Division of Ser. No. 377,951, Jan. 25, 1995, Pat. No. 5,599,435.

[30] Foreign Application Priority Data

Jan. 28, 1994 [CA] Canada .................................. 2114492

[51] Int. Cl.⁶ .................... C01G 45/02; C01D 15/02; H01M 6/14
[52] U.S. Cl. .................. 429/194; 423/599; 423/641; 423/593; 429/197; 429/218
[58] Field of Search ...................... 423/593, 599, 423/641; 429/218, 194, 197, 122

[56] References Cited

U.S. PATENT DOCUMENTS

| | | | |
|---|---|---|---|
| 4,302,518 | 11/1981 | Goodenough et al. | 429/104 |
| 4,507,371 | 3/1985 | Thackeray et al. | 429/191 |
| 4,959,282 | 9/1990 | Dahn et al. | 429/224 |
| 5,162,176 | 11/1992 | Herr et al. | 429/194 |
| 5,196,279 | 3/1993 | Tarascon | 429/194 |
| 5,219,679 | 6/1993 | Abraham et al. | 429/192 |
| 5,240,794 | 8/1993 | Thackeray et al. | 429/224 |
| 5,316,875 | 5/1994 | Murai et al. | 429/194 |
| 5,316,877 | 5/1994 | Thackeray et al. | 429/197 |
| 5,352,548 | 10/1994 | Fujimoto et al. | 429/197 |

OTHER PUBLICATIONS

J. R. Dahn, "Rechargeable $LiNiO_2$/Carbon Cells", *J. Electrochem. Soc.*, vol. 138, No. 8, Aug. 1991, pp. 2207–2211.

M.M. Thackeray, et al., "Spinel Electrodes from the Li–Mn–O System for Rechargeable Lithium Battery Applications", *J. Electrochem. Soc.*, vol. 139, No. 2, Feb. 1992, pp. 363–366.

W.L.F. David, et al., "The crystal structure of $Li_2MnO_2$", *Revue de Chemie minerale*, vol. 20, 1983, pp. 636–642.

JH. Kanoh, et al., "Equilibrium Potentials of Spinel–Type Manganese Oxide in Aqueous Solutions" *J. Electrochem. Soc.*, vol. 140, No. 11 (Nov., 1993).

*Primary Examiner*—Kathryn L. Gorgos
*Assistant Examiner*—Chrisman D. Carroll
*Attorney, Agent, or Firm*—Lerner, David, Littenberg, Krumholz & Mentlik

[57] ABSTRACT

Insertion compounds that are not stable in pure water can be prepared by an aqueous electrochemical method. The pH of the electrolyte and/or the concentration of ions of the inserted species must be sufficiently high to provide stability for the product compound. The method is useful for further lithiation of conventional lithium ion battery cathode materials.

8 Claims, 7 Drawing Sheets

NON-AQUEOUS BATTERY WITH NOVEL LITHIUM MANGANESE OXIDE CATHODE

This is a division of application Ser. No. 08/377,951, filed on Jan. 25, 1995, now U.S. Pat. No. 5,599,435.

FIELD OF THE INVENTION

This invention relates to methods for preparing insertion compounds. The invention is particularly related to methods for preparing lithiated transition metal oxide compounds suitable for use as electrodes for rechargeable non-aqueous batteries.

BACKGROUND OF THE INVENTION

Insertion compounds can be defined as those compounds wherein an amount of an element, molecule, or other species can be inserted into the host structure of the compound and then removed again without having irreversibly altered the host structure. Thus, while the host structure may be altered by insertion of a species, the original structure is retained upon subsequent removal of the species. Generally, only minor alterations of the host structure can occur before insertion is no longer reversible, although there are many examples of reversible phase transformations in the literature.

Insertion compounds have proven useful for a variety of applications such as use as ion exchangers, but they are particularly suitable for use in non-aqueous rechargeable batteries. The excellent reversibility of some of these compounds upon insertion with lithium makes such compounds very attractive for use as electrodes in lithium rechargeable batteries. Two manufacturers, Sony Energy Tec. and AT Battery, have made lithium-ion type batteries commercially available wherein both the cathode and anode electrodes are lithium insertion compounds. In each case, the cathode is a lithium cobalt oxide compound and the anode is a carbonaceous material.

Typically, lithium-ion type batteries are constructed using components that may be somewhat sensitive to water vapour but are otherwise stable in air. Thus, the batteries can be assembled economically under dry air conditions at the worst. It is therefore important to choose electrode materials that are air stable. Lithiated carbonaceous material anodes are not stable in air, so batteries are usually made in a completely discharged state wherein all the lithium in the battery resides in the cathode. Preferable cathode materials therefore have the maximum possible amount of lithium inserted while still being air stable. Additionally, cathode materials preferably are chosen that allow the maximum possible amount of lithium to be reversibly removed and re-inserted, hence providing the maximum battery capacity.

Many lithium transition metal oxide compounds may be used as cathodes in lithium-ion battery products. Along with $LiCoO_2$ (used in the Sony Energy Tec. product and described in U.S. Pat. No. 4,302,518 of Goodenough), other possible compounds include $LiNiO_2$, (also described in the aforementioned U.S. Patent), $LiMn_2O_4$ (described in U.S. Pat. No. 4,507,371), and other lithium manganese oxide compounds. Since cobalt is relatively rare, $LiCoO_2$ is relatively expensive compared to the latter two compounds. Both Co and Ni containing compounds are considered to be potential cancer causing agents and are therefore subject to strict handling requirements, particularly with respect to airborne particulate levels. Lithium manganese oxides are less of a toxicity concern and are relatively inexpensive. For these reasons, such oxides would be preferred in commercial lithium-ion type batteries if other performance requirements can be maintained.

Another attractive Li—Mn—O compound for use in lithium-ion batteries is $Li_xMnO_2$ having a $\gamma$-$MnO_2$ type structure wherein x can range approximately between 0 and 1. The $Li_xMnO_2$ compound can be synthesized from suitable precursor materials (see U.S. Pat. No. 4,959,282) but only for values of x between approximately 0.33 and 0.43. Further lithium can be inserted and reversibly removed electrochemically as described in the aforementioned '282 patent. Other Li—Mn—O compounds considered in lithium-ion batteries include $Li_2Mn_2O_4$ and $Li_4Mn_5O_{12}$ as described in M. M. Thackeray et al, J. Electrochem. Soc., 137, 769 (1990).

A Li—Mn—O compound denoted $Li_2MnO_2$ and having a layered structure described by the space group P-3m1 is known to exist. The lattice constants for this compound are a=3.195 Å and c=5.303 Å (W. I. F. David et al, Revue de Chimie Minerale, 20, 636 (1983)). However, it is not known from the literature whether lithium can be removed from $Li_2MnO_2$, electrochemically or otherwise, nor what would happen to the host structure if such removal were possible.

To enhance the operating capacity of lithium-ion type batteries, it has been considered desirable, where possible, to insert additional lithium into the cathode material using chemical means prior to battery construction. For example, $LiMn_2O_4$ with the spinel structure can be further lithiated reversibly up to a stoichiometry of $Li_2Mn_2O_4$ using a reaction involving LiI as described in U.S. Pat. No. 5,196,279. However, iodine compounds can be quite corrosive and this creates potential problems when contemplating such a process for large scale manufacturing. $Li_xMnO_2$ with the $\gamma$-$MnO_2$ structure might be further lithiated to $Li_1MnO_2$ using a similar process. Use of this latter compound would provide very high capacities in lithium-ion batteries of conventional construction.

An alternative method to further lithiate conventional insertion compounds would be to electrochemically insert the lithium. This could be accomplished using an electrochemical cell to process (or lithiate) a starting insertion compound. With lithium metal as an anode, the starting insertion compound as a cathode, and a suitable non-aqueous electrolyte comprising a lithium salt, a controlled discharge of the cell would result in the desired further lithiation of the starting insertion compound. However, such a process is prohibitive on a manufacturing scale, in part due to the use of highly reactive lithium metal.

Lithium transition metal oxides are generally not stable in air. Only if the lithium atoms are sufficiently tightly bound to the host will they not react with water vapour, oxygen, or $CO_2$ in the air. A direct measure of the binding energy of the lithium atoms in a lithium transition metal oxide is the voltage of said oxide with respect to lithium metal in a non-aqueous battery. Empirically, it has been determined in J. R. Dahn et al, J. Electrochem Soc., 138, 2207 (1991) that lithium insertion compounds are effectively air stable if the voltages of said compounds versus lithium are greater than 3.3±0.2 V. $Li_2Mn_2O_4$, with a voltage versus lithium near 2.8 V, reacts even with the moisture in the air to form LiOH and $LiMn_2O_4$. Similarly, $Li_1MnO_2$ having the $\gamma$-$MnO_2$ structure reacts with moisture in the air. While it is possible to construct a lithium-ion battery with cathode materials like these, special handling and storage procedures are required to minimize the reaction with air to an acceptable level in practice. Generally, it would be expected that direct exposure of these compounds to an aqueous environment would result in serious degradation of the compounds via reaction of the lithium with water.

SUMMARY OF THE INVENTION

The invention is directed to a method for preparing insertion compounds wherein an amount of an element is inserted into a first insertion compound thereby forming a second insertion compound, comprising: (a) preparing in an electrochemical cell having a working electrode collector, a counter electrode, and a basic aqueous electrolyte, an electrolyte comprising a salt of said element dissolved in water wherein the dissolved element is at a starting concentration and the electrolyte is at a starting pH; (b) electrically contacting said first insertion compound to the working electrode collector thereby forming a working electrode; (c) charging said cell such that electrons and ions of said element are supplied to the working electrode; (d) maintaining the concentration of the dissolved element in the electrolyte between the starting concentration and a final concentration; the final concentration being greater than zero; (e) maintaining the pH of the electrolyte between the starting pH and a final pH; the final pH being a value such that the concentration of $H^+$ is an order of magnitude or more less than said final concentration; and (f) isolating the second insertion compound after insertion is complete.

The element can be an alkali metal or an alkaline earth metal. The final concentration of the dissolved element in the electrolyte can be greater than about $10^{-4}$ moles per liter. The final pH of the electrolyte can be greater than 7. In particular, the final pH can be greater than about 10. The first insertion compound can be a lithium insertion compound, a lithium transition metal oxide or a lithium manganese oxide.

The element can be lithium, the first insertion compound can be the spinel $LiMn_2O_4$, and the second insertion compound can be $Li_xMn_2O_4$ wherein x is a number and $1<x\leq 2$.

The element can be lithium, the first insertion compound can be $Li_yMnO_2$ with a $\gamma$-$MnO_2$ structure wherein y is a number between about 0.2 and 4.5, and the second insertion compound can be $Li_xMnO_2$ wherein x is a number and $y<x\leq$ about 1. The second insertion compound can be $Li_xMnO_2$ having a layered structure described by the space group P-3m1.

The electrical contact can be intermittent or continuous. The salt can be a hydroxide of said element. The salt can be lithium hydroxide. The concentration of the dissolved element can be maintained by further addition of said salt to the electrolyte. The pH of the electrolyte can be maintained by further addition of said salt to the electrolyte. The isolation can comprise rinsing the second insertion compound in a solvent and drying the compound thereafter. The solvent can be alcohol.

The invention is also directed to a non-aqueous battery comprising an anode, a non-aqueous electrolyte, and a cathode comprising a second insertion compound prepared using the method described.

The invention includes a non-aqueous battery comprising an anode, a non-aqueous electrolyte, and a cathode comprising a second insertion compound prepared using the method as described. The anode can be selected from the group consisting of lithium, lithium alloys, carbonaceous insertion compounds and other insertion compounds. The non-aqueous electrolyte can comprise a lithium salt dissolved in a mixture of non-aqueous solvents, or $LiClO_4$ dissolved in a mixture of non-aqueous solvents, or $LiClO_4$ dissolved in a mixture of dimethyl carbonate (DMC), propylene carbonate (PC) and ethylene carbonate (EC) solvents.

The invention also pertains to a lithium manganese oxide material with formula $Li_xMnO_2$ wherein x is a number and $0.5<x\leq$ about 1, the material having a layered structure described by the space group P-3m1. x can be about 1 and the lattice constants of the layered structure can be approximately a=3.321 Å and c=4.736 Å. The invention includes a non-aqueous battery comprising an anode, a non-aqueous electrolyte, and a cathode comprising the lithium manganese oxide material of the invention.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
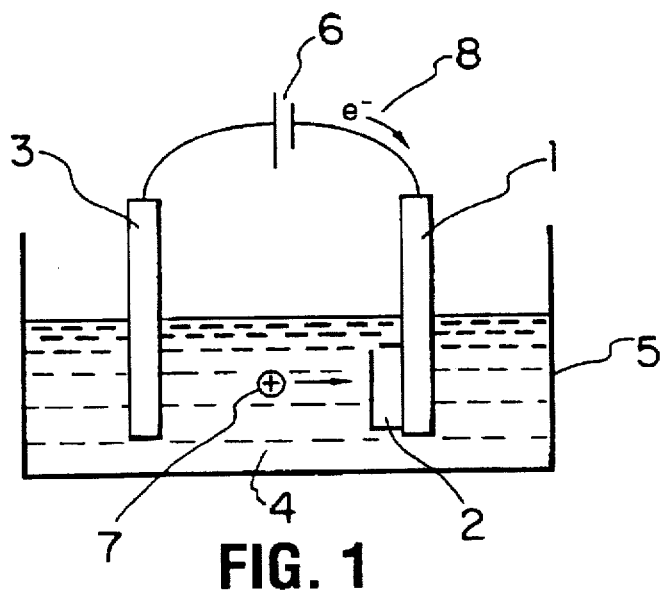
FIG. 1 depicts a schematic of the aqueous electrochemical cell used in the method of the invention.

The method of the invention applies thermodynamic principles in order to electrochemically prepare insertion compounds in aqueous solution that would not be stable in water itself. These principles relate the stability of an inserted element in an insertion compound to the concentrations of ions of the element in aqueous solution and to the pH of said solution. The method of the invention uses an aqueous electrochemical cell to electrochemically insert a specific amount of an element into a first insertion compound to thereby create a second insertion compound that is not stable in water itself. However, the second insertion compound is kept stable in the aqueous electrolyte after completion of the process if the concentration of ions of the element to be inserted is at a suitable final concentration greater than zero and if the pH of the aqueous electrolyte is at a suitable final pH such that the concentration of $H^+$ is much less than said final concentration. (In this context, 'much less' shall be intended to mean an order of magnitude or more.) Initially, an electrolyte is prepared using a sufficient amount of a suitable salt of the element such that the first insertion compound is stable therein. During the charging, the concentration of ions of the element are maintained between the starting concentration and the final concentration such that the intermediate insertion compounds produced are stable in the electrolyte. In a like manner, the pH of the electrolyte is maintained between the starting pH and the final pH during charging. After the insertion process is complete, the second insertion compound is isolated from the aqueous electrolyte.

Elements to be inserted can be selected from the group of alkali metals (ie. Li, Na, K, Rb, Cs and Fr) or from the group of alkaline earth metals (ie. Ca, Sr, Ba, and Ra).

The method of the invention can be effective in practice when the concentration of the dissolved element in the aqueous electrolyte is greater than about $10^{-4}$ moles per liter. Similarly, the method of the invention can be effective in practice when the pH of the aqueous electrolyte is greater than about 10.

The first insertion compound can be a lithium insertion compound. In particular, the first insertion compound can be a lithium transition metal oxide and can specifically be one of the lithium manganese oxide compounds shown in the examples to follow.

Several different lithium manganese oxides were prepared in these examples using the method of the invention. $Li_xMn_2O_4$ wherein x is a number and $1<x\leq 2$ was prepared using $LiMn_2O_4$ as the first insertion compound and lithium as the element to be inserted. Also, using $Li_xMnO_2$ with $\gamma$-$MnO_2$ structure as the first insertion compound and lithium as the element to be inserted, the further lithiated $Li_xMnO_2$ compound wherein $y<x\leq$ about 1 can be prepared. Finally, it is shown that a hitherto unknown Li—Mn—O compound, $LiMnO_2$ with layered structure described by the space group P-3m1, can be prepared from $Li_xMnO_2$ using the invention method.

The electrochemical cell of the invention method has a working electrode collector, a counter electrode and an aqueous electrolyte. The electrical contact required between the working electrode collector and the first insertion compound may be intermittent or continuous.

Preferably, the salt used in the aqueous electrolyte is a hydroxide of the element to be inserted. Thus, in order to further lithiate an insertion compound, the preferred salt is LiOH. During the electrochemical insertion process, salt in the aqueous electrolyte is consumed. In order to maintain both the concentration of the dissolved element and the pH, additional salt may be added as salt is consumed.

One means for isolating the second insertion compound after insertion is complete is by rinsing the compound in a suitable solvent mixture and drying thereafter. Insertion compounds that are not stable in water may be stable enough in alcohol over the isolation time frame. Thus, alcohol can be used as a rinsing solvent.

Insertion compounds prepared by the method of the invention may be used as a component of a cathode in a non-aqueous battery. The anode for a non-aqueous lithium battery can be lithium metal, a lithium alloy, a carbonaceous insertion compound, or other insertion compound. The electrolyte used in a non-aqueous lithium battery comprises a lithium salt dissolved in a mixture of non-aqueous solvents. As shown in the examples to follow, working non-aqueous lithium batteries can be constructed wherein the salt is $LiClO_4$ and the solvent mixture consists of dimethyl carbonate (DMC), propylene carbonate (PC) and ethylene carbonate (EC) solvents.

A lithium manganese oxide material with formula $Li_xMnO_2$ wherein x is a number and $0.5<x\leq$ about 1 was discovered using the invention method. The material has a layered structure described by the space group P-3m1. The lattice constants of the layered structure of the material are approximately a=3.321 Å and c=4.730 Å when x is about 1. Prepared by any means, the material may be used as a component of a cathode in a non-aqueous battery.

The invention method can be carried out using a variety of electrochemical cell configurations. One such configuration is that shown in the schematic drawing in FIG. 1 of an aqueous electrochemical cell. Said cell has a working electrode collector 1 and a first insertion compound in powder form 2 in continuous electrical contact with it thereby creating a working electrode. Also necessary is a counter electrode 3, an excess of a suitable aqueous electrolyte 4, and a container 5. A power supply 6 is used as means for creating current flow. Given a desired starting or first insertion compound and the desired final or second insertion compound, a suitable electrolyte must be prepared. Preferably, the hydroxide of the element to be inserted is used as a salt, and water is used as a solvent. During the process, both the salt concentration and the pH of the electrolyte solution should be at levels such that the insertion compounds so prepared are stable in the presence of the electrolyte. Generally the salt concentration and the pH are initially set at levels such that the final desired product is stable in the electrolyte.

A current flow is then initiated using the power supply to charge the cell. This in turn results in insertion of the element into the insertion compound as ions of the element 7 and electrons 8 flow to the working electrode via the electrolyte solution and external circuit respectively. Charging is continued until the desired amount of the element is inserted. During this process, salt in the electrolyte is consumed as ions of the element are inserted into the solid insertion compound.

During charging, the salt concentration and pH of the electrolyte must be maintained at levels such that the insertion compounds so prepared are stable in the presence of the electrolyte. Where possible, such as in the batch process described in the preceding, an excess of ions of the element and [OH$^-$] may be used such that adequate levels of each might be maintained throughout the process without the need for replenishment. In this embodiment, the concentration of both species decreases as the process proceeds. Conversely, the concentrations of the ions of the element and [OH$^-$] may be increased as necessary during the process such that the insertion compounds are stable in the electrolyte as the process is carried out. Generally it is expected that, in industrial scale processes, replenishment of both species will be necessary as the electrochemical reaction proceeds. Thus, it may be simpler to maintain the concentration of both species at set values throughout the process.

More than one salt may be used in the process, one perhaps to supply ions of the element and another to maintain a pH. However, a preferred choice uses only the hydroxide of the element to be inserted. In that way, the concentration of ions of the element and pH are related. A simple measurement of the pH of the electrolyte solution then provides an indicator for both and this measurement can be used to control the process.

One potentially attractive use of the invention process is for the lithiation of electrolytic manganese dioxide (EMD).

Lithiated EMD is an excellent 3 V cathode material for lithium batteries. In the manufacture of EMD, deposits of $MnO_2$ are plated onto titanium electrodes in an acid bath. Thus, working electrodes for the invention method are naturally prepared in the course of preparing the first insertion compound. The plated electrodes might then be rinsed, heat treated if desired, dipped in LiOH solution, and lithiated using the invention method.

Other preferred embodiments for the invention method will be apparent to those skilled in the art. For example, cell designs can be envisaged that would eliminate the need to construct a coherent working electrode out of the insertion compound. Such designs could include flow cells, stirred tanks where the tank itself acted as a working electrode collector, or the like where the insertion compound would make intermittent contact with the working electrode collector.

The required levels for the salt concentration and pH in order to maintain stability are a function of the chemical potential of the inserted species in the host insertion compound. These levels can be determined empirically. However, the inventors believe that these levels can also be roughly determined using thermodynamic principles. Without being bound by theory, the inventors offer the following arguments to illustrate why insertion compounds that are not stable in water may be stable in certain aqueous solutions and also to illustrate the conditions needed for stability of the insertion compound with respect to the concentration of elemental ions and [$OH^-$] in such solutions.

First the stability of lithium insertion compounds in water is considered. A given insertion compound containing lithium, Li, has a chemical potential, $\mu^{int}_{Li}$, which corresponds to a voltage with respect to lithium metal of $$V = -(1/e) \, (\mu^{int}_{Li} - \mu^0_{Li}) \quad \text{[Equation 1]}$$

where $\mu^0_{Li}$ is the chemical potential of Li in Li metal. It is assumed that the compound is placed in water with neutral pH and that there is so much compound relative to water that $\mu^{int}_{Li}$ does not vary. Where possible, Li in the insertion compound reacts with water.

In equilibrium, the following reaction holds:

$$\text{Li (inserted)} + H_2O \leftrightarrows Li^+ + OH^- + (1/2) H_2 \uparrow \quad \text{[Equation 2]}$$

Presumably, little bubbles of $H_2$ will form over the surface of the compound, so the $H_2$ will be at approximately 1 atmosphere pressure, in its standard state. Therefore, in equilibrium $$\mu^{int}_{Li} + \mu^0_{H2O} = \mu^0_{OH-} + \mu_{Li+} + (1/2) \mu^0_{H2} \quad \text{[Equation 3]}$$

Charge conservation requires that $$[Li^+] + [H^+] = [OH^-]$$

where [$Li^+$] is the concentration of $Li^+$ in moles per liter. Provided sufficient lithium reacts with the water, the solution will become strongly basic, so that $$[Li^+] >> [H^+]$$

and the approximation $$[Li^+] = [OH^-] \quad \text{[Equation 4]}$$

can be made. The chemical potentials of $OH^-$ and $Li^+$ in solution depend on concentration through the Nernst equation as $$\mu_{Li+} = \mu^0_{Li+} + kT \ln[Li^+] \quad \text{[Equation 5a]}$$

$$\mu_{OH-} = \mu^0_{OH-} + kT \ln[OH^-] \quad \text{[Equation 5b]}$$

where $\mu^0_{Li+}$ and $\mu^0_{OH-}$ are the chemical potentials of $Li^+$ and $OH^-$ respectively in 1 molar solution, k is Boltzmann's constant and T is the Kelvin temperature. Combining Equations 3, 4, 5a and 5b we obtain $$2 kT \ln[OH^-] = \mu^{int}_{Li} + \mu^0_{H2O} - \mu^0_{Li+} - (1/2) \, \mu^0_{H2} \quad \text{[Equation 6]}$$

By definition, $$pH = -\log_{10}[H^+].$$

and in addition, [$H^+$] [$OH^-$] = $10^{-14}$ for aqueous solutions. Therefore, $$\log_{10}[OH^-] = pH - 14 \quad \text{[Equation 7]}$$

Equation 7 is substituted into Equation 6 to give $$0.118 \, pH = 1.657 + \mu^{int}_{Li} + \mu^0_{H2O} - \mu^0_{Li+} - (1/2) \, \mu^0_{H2} \quad \text{[Equation 8]}$$

where kT=0.0257 eV/atom at 25° C. has been substituted in. The units of all terms are in electron volts. The term involving chemical potentials in Equation 8 is easily evaluated from thermodynamics tables (such as 'Handbook of Chemistry and Physics', CRC Press). Using Equation 1,

Substituting this into Equation 8 gives a term

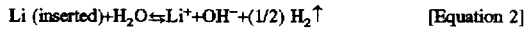

This term is minus the partial molar free energy change for the reaction $$Li_{(s)} + H_2O_{(l)} \rightarrow LiOH_{(aq.1M)} + 1/2 H_{2(g, STP)}$$

The free energy change is 51.23 Kcal/mole or 2.228 eV/atom. Substituting in Equation 8 gives $$0.118 \, pH = 1.657 - eV + 2.228,$$

or $$eV = 3.885 - 0.118 \, pH \text{ (electron volts)}$$

Dividing through by e, gives the result $$V = 3.885 - 0.118 \, pH \text{ (volts)} \quad \text{[Equation 9]}$$

Equation 9 shows that water-unstable lithium insertion compounds, which have a voltage V versus Li metal, will react when placed in water with a resulting equilibrium pH roughly given by the solution to the equation. Table 1 lists the solution to Equation 9 for several pH's.

TABLE 1

| EXAMPLES OF SOLUTIONS TO EQUATION 9 | |
|---|---|
| V (volts) | pH |
| 2.228 | 14 |
| 2.346 | 13 |
| 2.464 | 13 |
| 2.582 | 11 |
| 2.700 | 10 |
| 2.818 | 9 |

Therefore, compounds like $Li_2Mn_2O_4$ or $LiMnO_2$ with the γ-$MnO_2$ structure that have V about 2.8 V can be stable in aqueous solutions of LiOH where the pH is greater than about 10. Since it was assumed that $[Li^+]=[OH^-]$, this corresponds to stability when the concentration of lithium ions is greater than about $10^{-4}$ moles per liter. At lower pH or ion concentrations, the approximation leading to equation 4 becomes invalid. However, any aqueous solution where the ion concentration is greater than zero and the pH is such that $[H^+]<<[Li^+]$ will provide greater stability over that provided by pure water. (Note that Equation 2 suggests that high LiOH concentrations and high $H_2$ over-pressures can cause insertion of Li in solids in aqueous solution. However, the use of high hydrogen pressures can be impractical partly as a result of safety concerns. The method of the invention avoids this problem).

Using the preceding theory, a rough estimate might be made for the pH level required to maintain stability of a given lithium insertion compound with known voltage with respect to lithium metal under conditions where the concentrations of the $[Li^+]$ and $[OH^-]$ are roughly similar. For a situation where the lithium insertion compound is placed in a basic solution of a different salt, denoted $M^+OH^-$, a similar derivation leads to $$V = 3.885 - 0.118*pH - \frac{kT^*}{e} \ln\left[1 - \frac{[M^+]}{[OH^+]}\right] \quad \text{[Equation 10]}$$

The additional term (compared to Equation 9) is positive since $[M^+]<[OH^-]$ and results in an increase in the voltage needed for stability at a particular pH. Thus, in cases where $[Li^+]$ is not roughly equal to $[OH^-]$, the stability of the lithium insertion compound in aqueous solution will be a function of both $[Li^+]$ and $[OH^-]$.

Now the method of the invention is considered. Using a LiOH electrolyte in the method of the invention schematically shown in FIG. 1, the reaction which occurs at the counter electrode is:

$$2\ OH^-_{(aq)} \rightarrow H_2O + (1/2)O_{2(g)} + 2e^-$$

(+0.401 V versus standard hydrogen electrode or S.H.E.)

At the working electrode, two processes can occur. The first is the desired reaction:

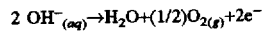

(V(x) − 3.04 V vs S.H.E.)

where V(x) is the voltage of $Li_x$ (Li insertion compound) versus metallic Li and 3.04 V is the standard electrode potential of Li→$Li^+$+$e^-$ versus S.H.E. ('Handbook of Chemistry and Physics', CRC Press). The second reaction corresponds to hydrogen evolution at the working electrode:

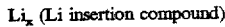

Provided that V(x) is greater than about 2.3 V, lithium insertion will occur if the current density is chosen appropriately.

Figure 2:
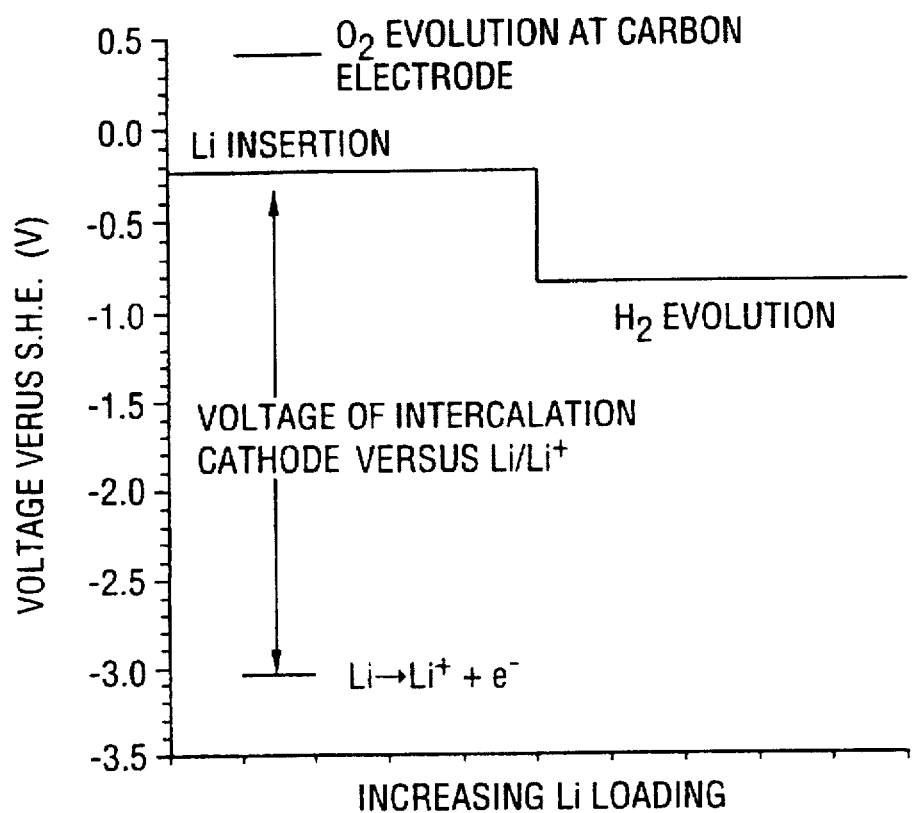
FIG. 2 illustrates the mechanisms that occur in the electrochemical process of the invention with example voltages relative to the standard hydrogen electrode.

FIG. 2 illustrates the mechanisms that occur in the electrochemical process of the invention and their voltages (for a case employing 1M LiOH electrolyte at 25° C.) relative to the standard hydrogen electrode. As Li is loaded into the Li insertion compound, the voltage of the aqueous cell tracks the V(x) profile for that particular compound. Depicted is a material which has V(x)=constant=2.8 V for a substantial amount of added Li, followed by V(x)=constant<2.2 V for the remaining Li. Initially, as current flows in the cell, Li is inserted into the lithium insertion compound, forming $Li_x$ (lithium insertion compound). Once the capacity of the 2.8 V plateau is exhausted, the voltage drops to near −0.83 V versus S.H.E. or 2.22 V versus Li metal and hydrogen evolution occurs.

The production of hydrogen at the working electrode may not be detrimental to the insertion compounds produced by the invention process. It may thus be acceptable and hence desirable to run the electrochemical cell at high current densities. This would be expected to generate large overvoltages across the working electrode possibly resulting in $H_2$ generation at the front of the electrode coupled with insertion occurring at the back of the electrode. On the other hand, the generation of flammable hydrogen may be avoided by restricting the insertion compounds used to those with capacity above 2.3 or 2.4 Volts versus lithium metal and by stopping the reaction just at or before the point when hydrogen production begins. In this case, it would also be important to limit the cell current density so that large overvoltages do not occur.

Thus, the preceding discussion offers an explanation of why lithium insertion compounds that are not stable in water may be stable in certain aqueous solutions. Also, the principles are indicated for roughly determining what conditions may be required to put the method of the invention to use in making lithium insertion compounds as well as to what extent this is possible. Those skilled in the art will appreciate that similar principles may apply in circumstances involving other alkali metal insertion compounds that are not stable in water. Additionally, the basic principles can be expected to apply to alkaline earth insertion compounds. Therefore, the possibility exists for using the method of the invention to prepare alkali metal or alkaline earth metal insertion compounds that may not be stable in neutral water alone.

Compounds prepared using the method of the invention may find practical use as a cathode material in lithium ion batteries. A variety of battery embodiments are possible using cathode material prepared by the method of the invention. Miniature laboratory batteries employing a lithium metal anode are described in the examples to follow. A preferred construction for a lithium ion type system is that depicted for a commercially available spiral-wound type battery in the cross-sectional view of FIG. 3. A jelly roll 14 is created by spirally winding a cathode foil (not shown), an anode foil (not shown), and two microporous polyolefin sheets (not shown) that act as separators.

Cathode foils are prepared by applying a mixture of powdered lithium insertion compound prepared using the method of the invention, possibly other powdered cathode material if desired, a binder, and a conductive dilutant onto a thin aluminum foil. (A preferred cathode material in the art is $Li_xMn_2O_4$ wherein 1<x<2). Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that powdered carbonaceous material (either partially graphitized carbon or graphite) is used instead of the cathode material and thin copper foil is usually used instead of aluminum. Anode foils are typically slightly wider than the cathode foils in order to ensure that anode foil is always opposite cathode foil. This feature is illustrated with the cathode upper edge 23, cathode lower edge 24, anode upper edge 22, and anode lower edge 25 depicted in FIG. 3.

Figure 3:
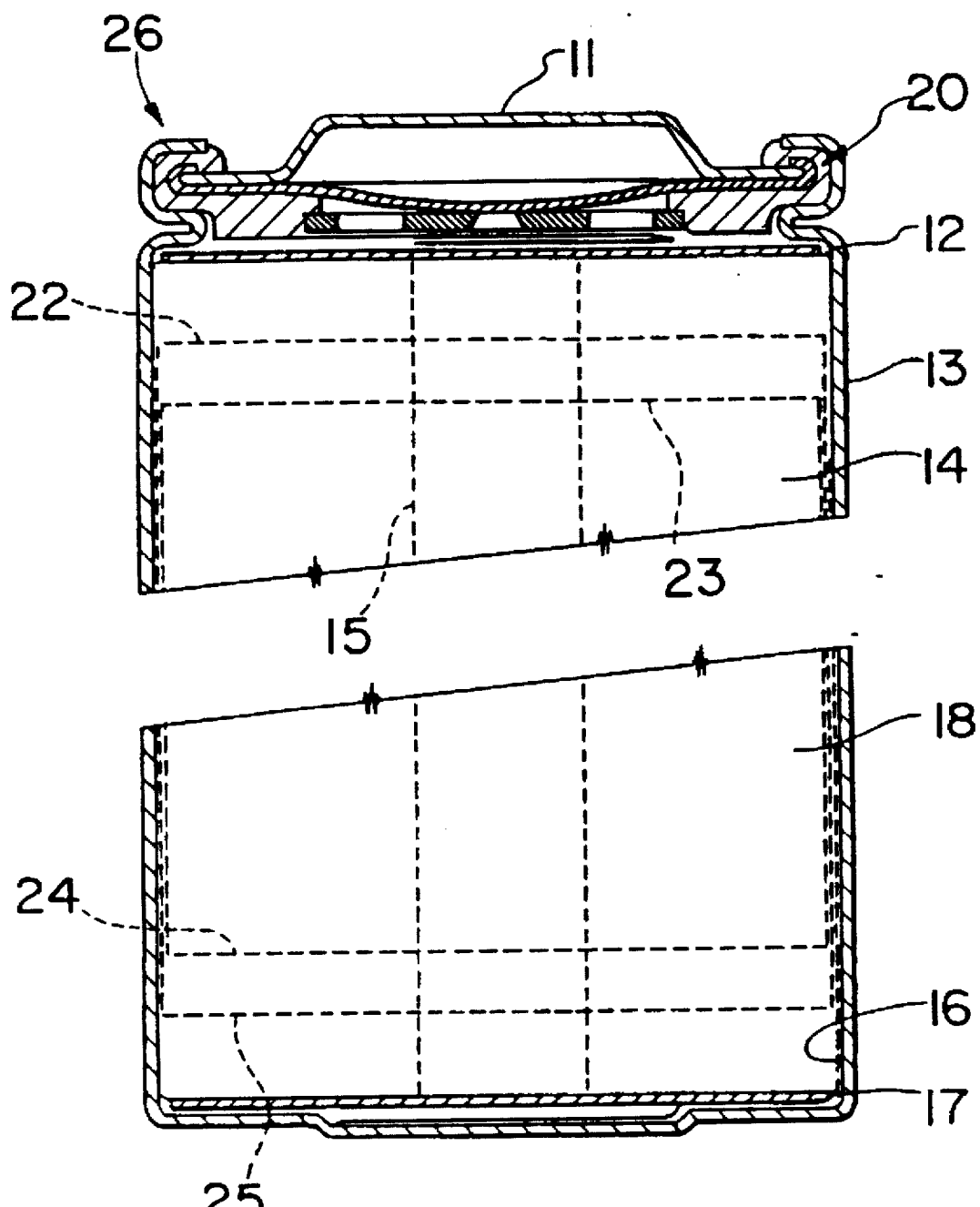
FIG. 3 depicts a cross-sectional view of a spiral-wound type lithium ion battery.

The jelly roll 14 is inserted into a conventional battery can 13. A header 11 and gasket 20 are used to seal the battery 26. The header may include safety devices if desired. A combination safety vent and pressure operated disconnect device may be employed. FIG. 3 shows one such combination that is described in detail in Canadian Patent Application Serial No. 2,099,657. Additionally, a positive thermal coefficient device (PTC) may be incorporated into the header to limit the short circuit current capability of the battery. The external surface of the header 11 is also used as the positive terminal, while the external surface of the can 13 serves as the negative terminal.

Appropriate cathode tab 15 and anode tab 16 connections are made to connect the internal electrodes to the external terminals. Appropriate insulating pieces 12 and 17 may be inserted to prevent the possibility of internal shorting. Prior to crimping the header 11 to the can 13 in order to seal the battery, electrolyte 18 is added to fill the porous spaces in the jelly roll 14.

Those skilled in the art will understand that the types of and amounts of the component materials must be chosen based on component material properties and the desired performance and safety requirements. Use of the method of the invention is expected to provide additional flexibility in this choice, in that the method allows certain properties to be varied independently. Generally an electrical conditioning step, involving at least the first recharge of the battery, is part of the assembly process. Again, the determination of an appropriate conditioning step along with the setting of the battery operating parameters (eg. voltage, current, and temperature limits) would be required of someone familiar with the field.

Other configurations or components are possible for the batteries of the invention. For example, a prismatic format is considered highly desirable and possible. Also, Li metal or Li alloys may be used as the anode material. A miniature version of a Li metal anode based embodiment is described in the laboratory coin cell examples to follow.

A hitherto unknown phase of Li—Mn—O compounds has been discovered using the method of the invention. This material can be described by the formula $Li_xMnO_2$ wherein x is a number between about 0.5 and about 1. The material has a layered structure described by the space group P-3m1. As shown in the examples to follow, lithium can be electrochemically inserted and removed over the aforementioned range in x. When x is approximately 1, the lattice constants of this material are about a=3.321 Å and c=4.736 Å. One possible application for such a material is a cathode material in a non-aqueous battery.

The examples to follow are useful in illustrating certain aspects and possible materials that can be synthesized using the method of the invention. However, the examples should not be construed as limiting the scope of the invention in any way.

In these examples, aqueous electrochemical cells like those depicted in FIG. 1 were used to demonstrate certain aspects of the method of the invention. In all cases, a lithium manganese oxide (Li—Mn—O) powder was employed as the first insertion compound. A working electrode was formed by sandwiching said powder between two 3 mm thick titanium bars in the following manner. Each bar had about 20 uniformly spaced 2 mm diameter through holes located in the lower 50 mm of its length. A paste consisting of a mixture of Li—Mn—O powder, Super S carbon black (trade-mark product of Ensagri), and polyvinylidene fluoride (PVDF) in amounts of 87, 10, and 3% by weight respectively in N-methyl pyrollidinone (NMP) solvent was made initially. The paste was then spread onto both electrodes and was pushed into the holes as well to ensure good bonding.

The electrodes were clamped together so that the active layers touched, thereby making a Ti—(Li—Mn—O)—Ti sandwich. The paste was then dried by placing the assembly in a drying oven at 105° C. in air in order to remove the NMP. Typical electrodes used 4.0 grams of Li—Mn—O powder and had an area of 5 cm×2.5 cm. The thickness of the Li—Mn—O layer between the two Ti bars was about 4 mm.

The Li—Mn—O electrode sandwiched between the Ti bars and a carbon counter electrode were immersed to a depth of about 70 mm in about 500 ml of electrolyte in a pyrex beaker and the beaker was then covered with a lucite lid. The electrode spacing was typically about 25 mm. The beaker was then placed in a temperature controlled oil bath. Temperatures between 16° C. and 96° C. could be attained. The electrodes were connected to a current supply. Currents ranging between 3 and 40 mA were applied to the cell. Currents were applied from 24 hours to 240 hours, depending on the synthesis. The number of electrons transferred to the Li—Mn—O electrode were calculated from the current, the mass of Li—Mn—O, and the current duration.

After the aqueous electrochemical reaction, the Ti sandwich working electrode was disassembled and the reacted powder was rinsed in alcohol. The powder was then dried between about 80° C. and 110° C. under vacuum. The powder was then analyzed by x-ray diffraction and evaluated in laboratory coin cell batteries.

A Philips powder diffractometer equipped with a Cu target x-ray tube and a diffracted beam monochrometer was used for the x-ray diffraction measurements. Hill and Howard's version (J. Appl. Crystallography, 18,173 (1985)) of the Rietveld (J. Appl. Crystallography, 2, 65 (1969)) powder profile refinement software was used to quantitatively analyze the x-ray data. All x-ray measurements were made with the powders exposed to air.

Figure 4:
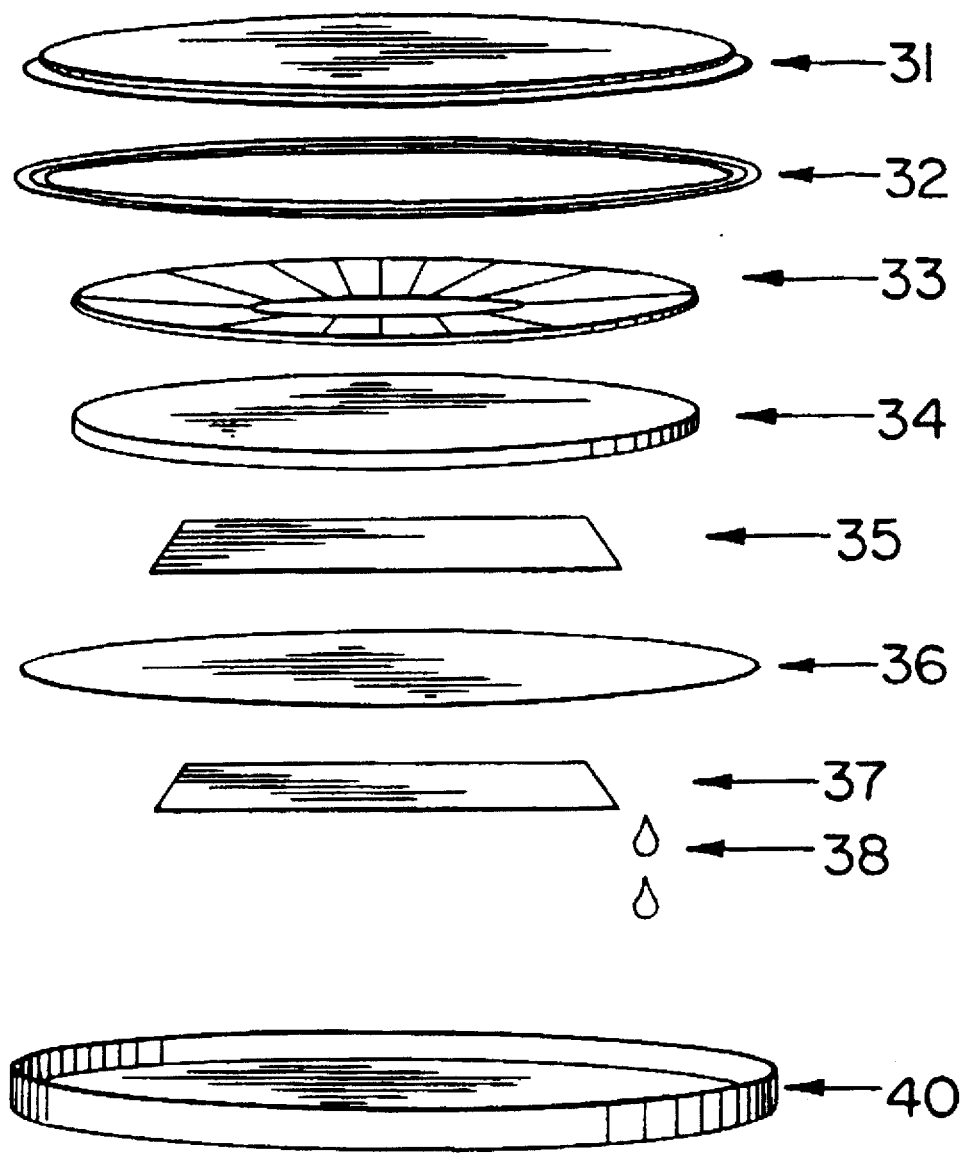
FIG. 4 depicts an exploded view of a laboratory coin cell battery used in the Examples.

Laboratory coin cell batteries were used to determine electrochemical characteristics. These were assembled using conventional 2325 size hardware (i.e., 23 mm diameter, 2.5 mm thick) and with assembly taking place in an argon filled glove box as described in J. R. Dahn et al, Electrochimica Acta, 38, 1179 (1993). FIG. 4 shows an exploded view of the coin cell type battery. A stainless steel cap 31 and special oxidation resistant case 40 comprise the container and also serve as negative and positive terminals respectively. A gasket 32 is used as a seal and also serves to separate the two terminals. Mechanical pressure is applied to the stack comprising lithium anode 35, separator 36, and cathode 37 by means of mild steel disc spring 33 and stainless disc 34. The disc spring was selected such that a pressure of about 15 bar was applied following closure of the battery. 125 μm thick metal foil was used as a lithium anode 35. Celgard 2502 (trade-mark) microporous polypropylene film was used as the separator 36. The electrolyte 39 was a solution of 1M $LiClO_4$ salt dissolved in a solvent mixture of DMC, PC and EC in a volume ratio of 50/25/25 respectively.

Cathodes 37 were made by uniformly coating a 20 μm thick aluminum foil substrate with a blend containing the processed mixture of Li—Mn—O powder, Super S carbon black (trade-mark) conductive dilutant, and PVDF binder plus additional ethylene propylene diene monomer (EPDM) binder. This was accomplished by initially making a slurry containing cyclohexane solvent wherein the Li—Mn—O powder, carbon black, and PVDF mixture were added to an appropriate amount of binder solution containing 4% EPDM in cyclohexane, such that 3% of the final dried electrode mass would be EPDM. Excess cyclohexane was then added until the slurry viscosity was like that of a syrup, whereupon the slurry was then coated onto the foil using a doctor blade spreader. Cyclohexane was then evaporated away at room temperature in air. After drying, the electrode was compacted between flat plates at about 25 bar pressure. A cathode 37 of dimension 1.2 cm×1.2 cm was then cut from this larger electrode using a precision cutting jig. The cathode 37 was then weighed and the active Li—Mn—O mass present was obtained by subtracting the weight of Al foil, EPDM, and carbon black present.

Coin cell batteries were thermostatted at 30°±1° C. before testing and were then charged and discharged using constant current cyclers with ±1% current stability. Currents were adjusted to be 2.8 mA/gram of active Li—Mn—O mass for all tests. Data was logged whenever the cell voltage changed by more than 0.005 V.

EXAMPLE 1

Figure 5:
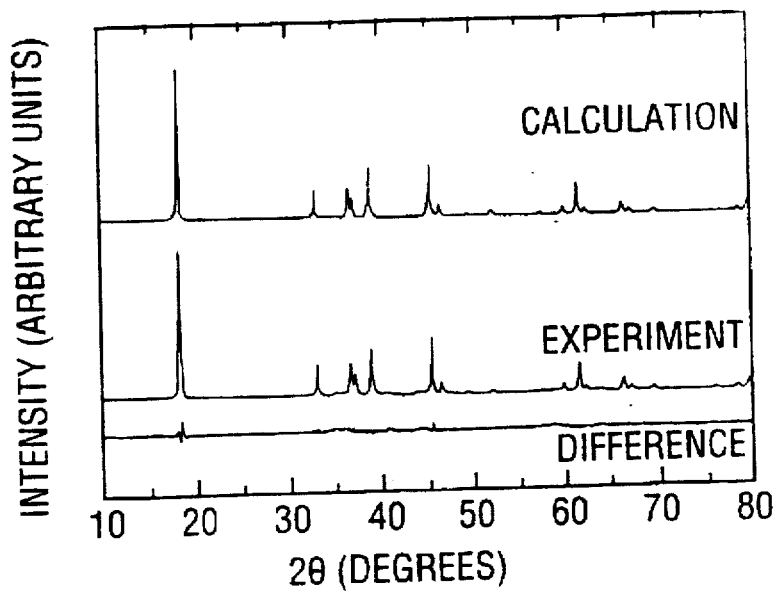
FIG. 5 depicts the x-ray diffraction pattern for the material of Example 1 along with a calculated pattern and the difference between the measured and calculated patterns.

LiMn$_2$O$_4$ was synthesized from Li$_2$CO$_3$ and Chemical Manganese Dioxide. Stoichiometric amounts of the reactants were mixed and reacted at 750° C. in air for 24 hours. The lattice constant of this material was 8.246 Å, in good agreement with the literature value (M. M. Thackeray et al, J. Electrochem. Soc., 137, 769 (1990)). 4.0 grams of this material were sandwiched between Ti bars to make a working electrode from which an aqueous electrochemical cell was made. The electrolyte used was 2.5M LiOH. A current of 20 mA was used and 0.73 electrons per manganese were transferred to the LiMn$_2$O$_4$ electrode at an operating temperature of 75° C. The powder was recovered and examined by x-ray diffraction. FIG. 5 shows the measured pattern, a calculation for Li$_2$Mn$_2$O$_4$ (based on the literature values given in T. Ohzuku et al, J. Electrochem. Soc., 137, 40 (1990) of the atom positions, lattice constants and the Space Group), and the difference between the measured and calculated patterns. The material produced is clearly Li$_2$Mn$_2$O$_4$ in agreement with the literature.

EXAMPLE 2

A series of 4 additional samples were made from the LiMn$_2$O$_4$ of Example 1 hereinafter labelled as samples I, II, III, and IV respectively. Table 2 describes the synthesis conditions for each sample. The number of electrons per manganese increases sequentially from sample I to IV as shown in Table 2. FIG. 6a to 6e shows the diffraction patterns of the starting material and those of samples I to IV respectively. The insertion of Li into LiMn$_2$O$_4$ proceeds in a two phase reaction,

x Li+LiMn$_2$O$_4$→x Li$_2$Mn$_2$O$_4$+(1−x) LiMn$_2$O$_4$

Diffraction peaks characteristic of the single phase compounds LiMn$_2$O$_4$ and Li$_2$Mn$_2$O$_4$ are identified by the numbers 1 and 2 respectively in FIGS. 6a and 6c. An additional novel phase to be discussed later in Example 5 is identified by the numbers 3 in FIG. 6e.

For less than 0.5 e/Mn, two phases are expected in the x-ray diffraction pattern. This is confirmed for sample I in the pattern of FIG. 6b. At about 0.5 e/Mn, Li$_2$Mn$_2$O$_4$ only is expected in the pattern. This is confirmed for sample II in the pattern of FIG. 6c. Beyond 0.5 e/Mn, the voltage of the aqueous cell drops and H$_2$ generation begins (refer to FIG. 2). Diffraction peaks chararacteristic of said novel phase appear in FIGS. 6d and 6e.

TABLE 2

SYNTHESIS CONDITIONS USED FOR THE MATERIALS DESCRIBED IN EXAMPLE 2
In all cases, the starting insertion compound used was LiMn$_2$O$_4$ and the aqueous electrolyte was 2.5M LiOH.

| Sample | Current (mA) | Temperature (°C.) | e/Mn | Final Products | Potential above that for H$_2$ production? |
|---|---|---|---|---|---|
| I | 3.0 | 17 | 0.31 | LiMn$_2$O$_4$ and Li$_2$Mn$_2$O$_4$ | Yes |
| II | 20.0 | 90 | 0.63 | Li$_2$Mn$_2$O$_4$ | No |
| III | 20.0 | 96 | 0.75 | Li$_2$Mn$_2$O$_4$ and novel phase | No |
| IV | 40.0 | 96 | 1.61 | Li$_2$Mn$_2$O$_4$ and novel phase | No |

EXAMPLE 3

Figure 7:
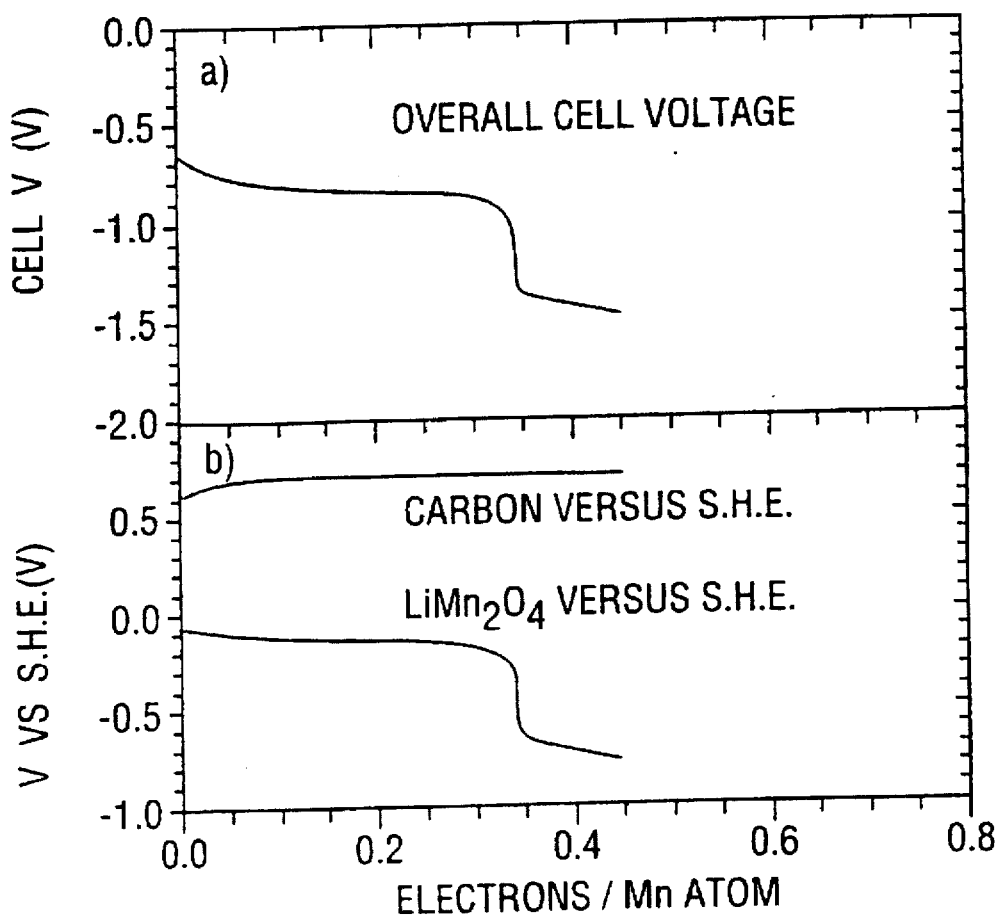
FIGS. 7a and 7b depict the overall cell voltage and individual electrode voltages versus S.H.E. of the aqueous electrochemical cell of Example 3.

A further sample V was made using LiMn$_2$O$_4$ as the starting material. The aqueous electrolyte used was 1.0 LiOH The current during synthesis was 2 mA and the synthesis temperature was 17° C. In this Example, a Ag/AgCl reference electrode was also included (+0.222 V vs. S.H.E.) to confirm the proposed cell reactions and to identify the sources of cell overvoltage. The reference electrode was roughly positioned midway between the counter and working electrodes. FIG. 7a shows the voltage of the aqueous cell as a function of the number of electrons/ Mn transferred. (This is the difference in voltage between the carbon counter electrode and the Ti working electrode.) FIG. 7b shows the voltage of each cell electrode versus S.H.E. (converted from Ag/AgCl reference readings). As FIG. 2 shows, the carbon electrode is expected to be near +0.401 V vs. S.H.E. in the absence of overvoltages. The LiMn$_2$O$_4$—Li$_2$Mn$_2$O$_4$ voltage plateau is expected at about 2.8 V versus Li. (−0.24 V versus S.H.E.) so the cell voltage is expected to be near −0.64 V. The observed cell voltage is near −0.9 V (due to overvoltages) and maintains a plateau until about 0.35 e/Mn was incorporated, at which point the potential decreases rapidly to near −1.6 V whereupon hydrogen evolution begins. Qualitatively, the behaviour mimics that expected from FIG. 2.

Figure 8:
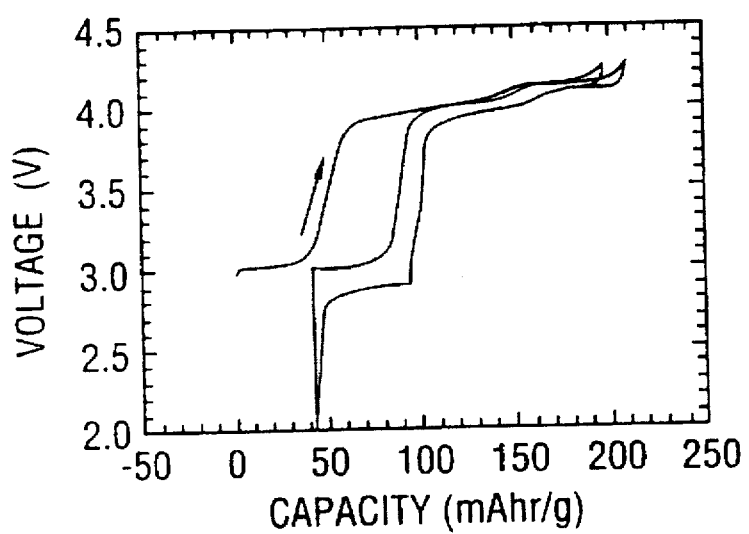
FIG. 8 depicts the voltage versus capacity for the coin cell battery of Example 3.

An additional sample VI was prepared in a like manner with e/Mn transferred equal to 0.31. The x-ray diffraction pattern of the product showed it to contain the two phases Li$_2$Mn$_2$O$_4$ and LiMn$_2$O$_4$. A laboratory coin cell battery was made as described previously using sample VI as the cathode material. FIG. 8 shows the voltage versus capacity of this Li/Li$_2$Mn$_2$O$_4$ battery. The cell shows a first recharge capacity of 200 mAh/g between 3.0 V and 4.2 V, followed by a cycling capacity near 160 mAh/g between 2.0 V and 4.2 V. The cycling capacity on the 4 V plateau is near 100 mAh/g.

EXAMPLE 4

Figure 9:
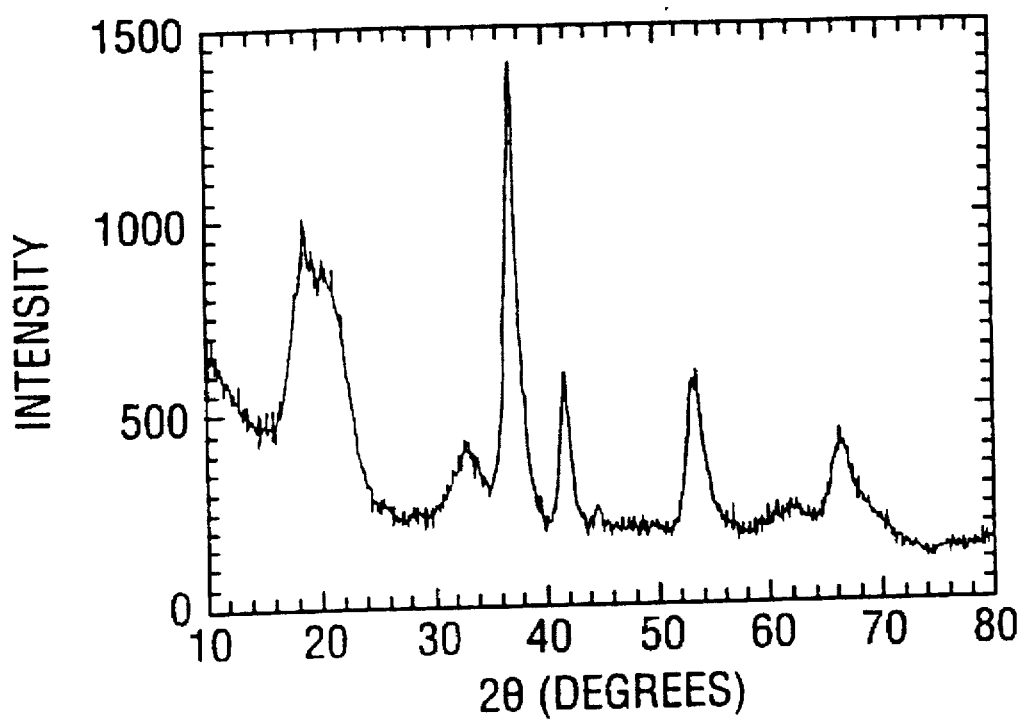
FIG. 9 depicts the x-ray diffraction pattern for the $Li_{0.36}MnO_2$ starting material of Example 4.
Figure 10:
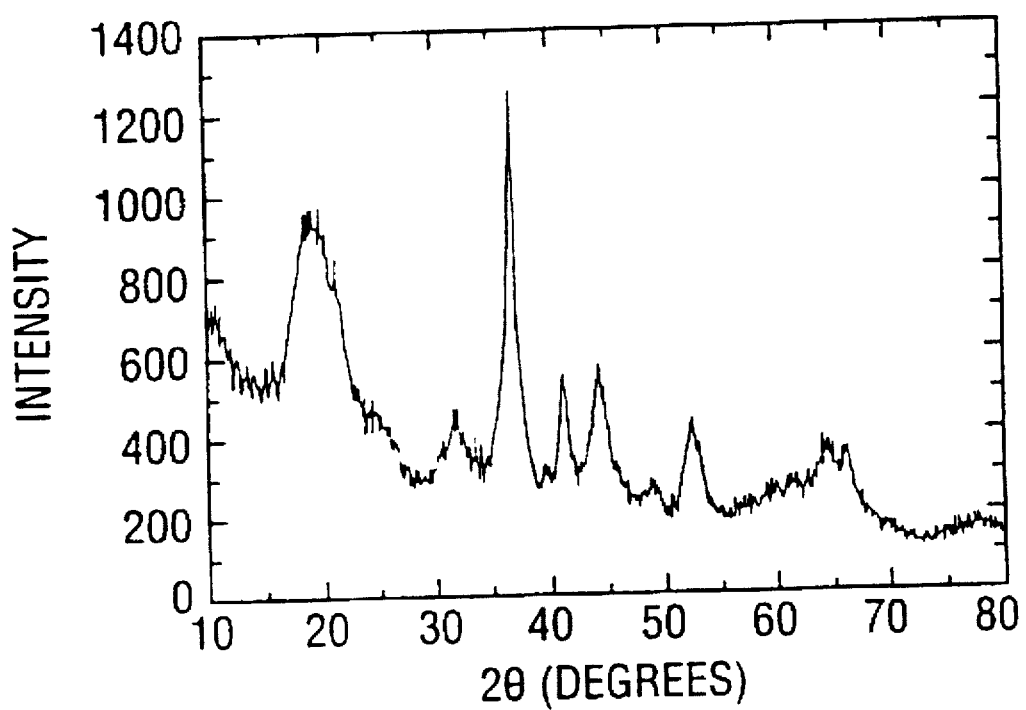
FIG. 10 depicts the x-ray diffraction pattern for the product material of Example 4.

Li$_{0.36}$MnO$_2$ with γ-MnO$_2$ structure was made by reacting LiOH.H$_2$O with electrolytic manganese dioxide (TAD #1 (trade-mark) obtained from Mitsui) in stoichiometric amounts. The materials were thoroughly mixed as described in U.S. Pat. No. 4,959,282 and were then heated at 350° C. for several hours in air. The x-ray diffraction pattern of the product is shown in FIG. 9. The Li$_{0.36}$MnO$_2$ product was then used to fabricate a working electrode as described previously for the further insertion of Li by aqueous methods. The aqueous cell used 2.5M LiOH as the electrolyte and was operated at a current of 3 mA at 16° C. to obtain a charge transfer of 0.5 e/Mn. The x-ray diffraction pattern of the resulting product is shown in FIG. 10. The material retains the characteristic diffraction pattern of γ-$MnO_2$ type material, but with some lattice constant changes compared to the starting material, presumably caused by the inserted Li.

Figure 11:
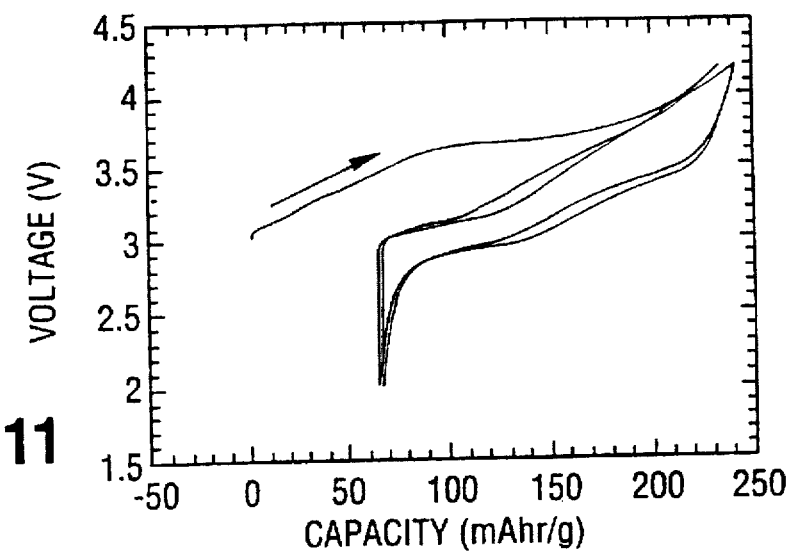
FIG. 11 depicts the voltage versus capacity of the coin cell battery of Example 4.

A laboratory coin cell battery was made using the resulting product of this example as the cathode material. FIG. 11 shows the voltage versus capacity for said battery, tested over several cycles. About 230 mAh/g of Li is removed during the first charging of the battery, followed by reversible cycling with near 180 mAh/g obtained.

EXAMPLE 5

Figure 12:
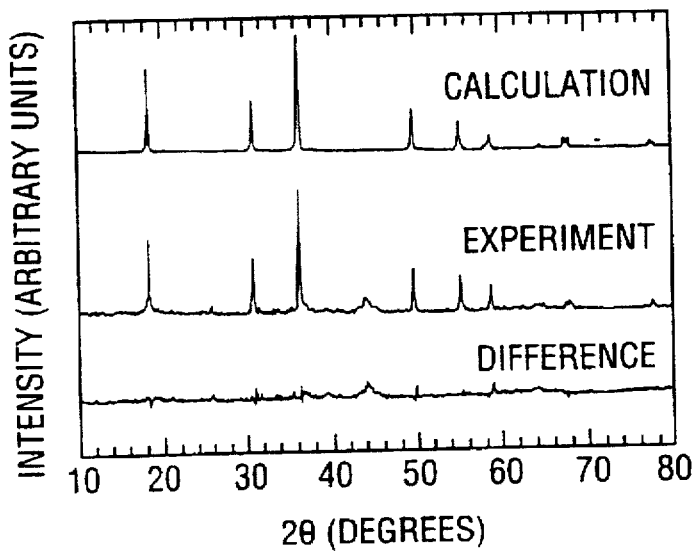
FIG. 12 depicts the x-ray diffraction pattern for the product material of Example 5.

An electrode for an aqueous electrochemical cell was made as in Example 4. The aqueous cell used 2.5M LiOH electrolyte and was operated at 75° C. at a current of 28 mA. A charge transfer of 0.98 e/Mn was achieved. At the end of the synthesis, the voltage of the cell corresponded to that of the lower plateau of FIG. 2, where hydrogen evolution reaction is presumably carrying the current. The x-ray diffraction pattern of the product is shown in FIG. 12. The pattern bears no resemblance to the pattern of the starting material shown in FIG. 9. Furthermore, the Bragg peak positions correspond exactly to those of the peaks labelled 3 in FIG. 6e.

The pattern can be indexed with a hexagonal unit cell of lattice constants a=3.321 Å and c=4.736 Å. The intensities and positions of the Bragg peaks are such that the product material appears to be isostructural to $LiTiS_2$ (J. R. Dahn et al, Can. J. Phys., 58, 207 (1980). The structure of $Mn(OH)_2$ is also isostructural to that of $LiTiS_2$, with lattice constants given by a=3.34 Å and c=4.68 Å. These constants are close to those of the product of this example. However, chemical analysis (using Inductively Coupled Plasma Mass spectrometry) of example material showed that it contained 0.87 Li atoms per Mn. Furthermore, when $Mn(OH)_2$ is heated to about 220° C. in argon, it decomposes to MnO and $H_2O$, incurring a large weight loss. By contrast, the product of this example showed little weight loss up to 500° C. when heated in argon, suggesting that it contains little incorporated hydrogen.

Figure 6:
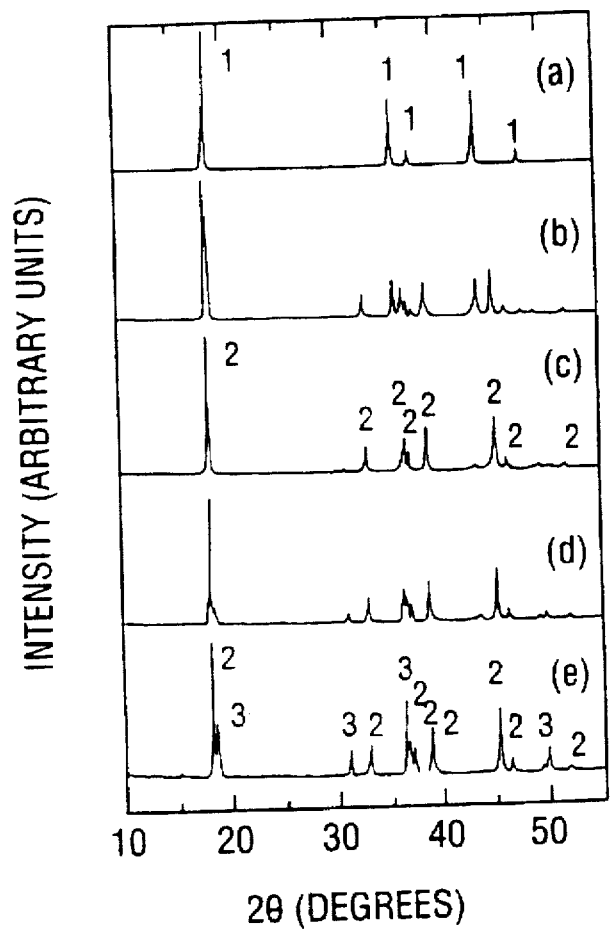
FIGS. 6a through 6e depict the x-ray diffraction patterns for the starting material and the samples I through IV of Example 2.

This Li—Mn—O product is formed slowly from spinel $Li_2 Mn_2O_4$ when the voltage of the aqueous cell is allowed to reach the hydrogen evolution plateau shown in FIG. 6. This Li—Mn—O phase apparently forms more readily from γ-$MnO_2$ structure type material than from spinel materials.

Figure 13:
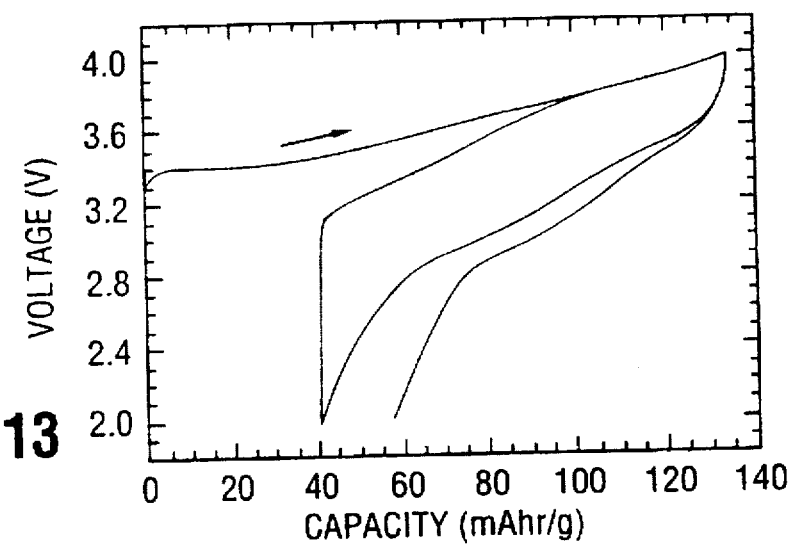
FIG. 13 depicts the voltage versus capacity of the coin cell battery of Example 5.

A laboratory coin cell battery was made using the product of this example as the cathode material. FIG. 13 shows the voltage versus capacity behaviour of this battery. About 130 mAh/g of Li can be extracted up to 4.0 V. The material can also reversibly cycle lithium.

The preceding examples specifically demonstrate how the invention method can be employed to prepare several Li—Mn—O compounds (including a hitherto unknown phase) suitable for use in non-aqueous lithium batteries. As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A lithium manganese oxide material with formula $Li_xMnO_2$ wherein x is a number and 0.5<x≦about 1, the material having a layered structure described by the space group P-3m1.

2. A material as in claim 1 wherein x is about 1 and the lattice constants of the layered structure are approximately a=3.321 Å and c=4.736 Å.

3. A non-aqueous battery comprising an anode, a non-aqueous electrolyte, and a cathode comprising the lithium manganese oxide material of claim 1.

4. The non-aqueous battery of claim 3, wherein said anode is selected from the group consisting of lithium, lithium alloys, carbonaceous insertion compounds and other insertion compounds.

5. The non-aqueous battery of claim 3, wherein said non-aqueous electrolyte comprises a lithium salt dissolved in a mixture of non-aqueous solvents.

6. The non-aqueous battery of claim 5, wherein said non-aqueous electrolyte comprises $LiClO_4$ dissolved in a mixture of non-aqueous solvents.

7. The non-aqueous battery of claim 6, wherein said non-aqueous solvent is a mixture of DMC, PC and EC solvents.

8. The non-aqueous battery of claim 5, wherein said non-aqueous solvent is a mixture of DMC, PC and EC solvents.

* * * * *

UNITED STATES PATENT AND TRADEMARK OFFICE
CERTIFICATE OF CORRECTION

PATENT NO. : 5,733,681

DATED : March 31, 1998

INVENTOR(S) : Li et al.

It is certified that error appears in the above-identified patent and that said Letters Patent is hereby corrected as shown below:

Column 7, line 54, "$[Li^{30}]$" should read --$[Li^+]$--.

Column 8, line 15, "$[OH^{31}]$" should read --$[OH^-]$--.

Column 12, line 55, "electrolyte 39" should read --electrolyte 38--.

Signed and Sealed this

Thirtieth Day of June, 1998

Attest:

*Attesting Officer*

BRUCE LEHMAN

*Commissioner of Patents and Trademarks*